(No Model.)

G. F. CLEMONS.
APPARATUS FOR TRANSMITTING DIFFERENTIAL ROTARY MOTION.

No. 321,086. Patented June 30, 1885.

WITNESSES,
F. W. Bartlett
Laura D. Clemons

INVENTOR,
George F. Clemons

UNITED STATES PATENT OFFICE.

GEORGE F. CLEMONS, OF SPRINGFIELD, MASSACHUSETTS.

APPARATUS FOR TRANSMITTING DIFFERENTIAL ROTARY MOTION.

SPECIFICATION forming part of Letters Patent No. 321,086, dated June 30, 1885.

Application filed December 3, 1884. (No model.)

*To all whom it may concern:*

Be it known that I, GEORGE F. CLEMONS, a citizen of the United States, residing at Springfield, in the county of Hampden and State of Massachusetts, have invented new and useful Improvements in Apparatus for Transmitting Differential Rotary Motion, of which the following is a specification.

This invention relates to improvements in mechanism for transmitting differential rotary motion in machines similarly as is done in my "apparatus for transmitting differential rotary motion," Patent No. 276,776, dated May 1, 1883, but having in substitution for the disk stud-pins and round holes of said patent a stud-pin in the differential gear-disk, which engages and slides in a radial slot of an arm of the resistance disk, drum, or eccentric, as hereinafter set forth.

Figures 1, 2:
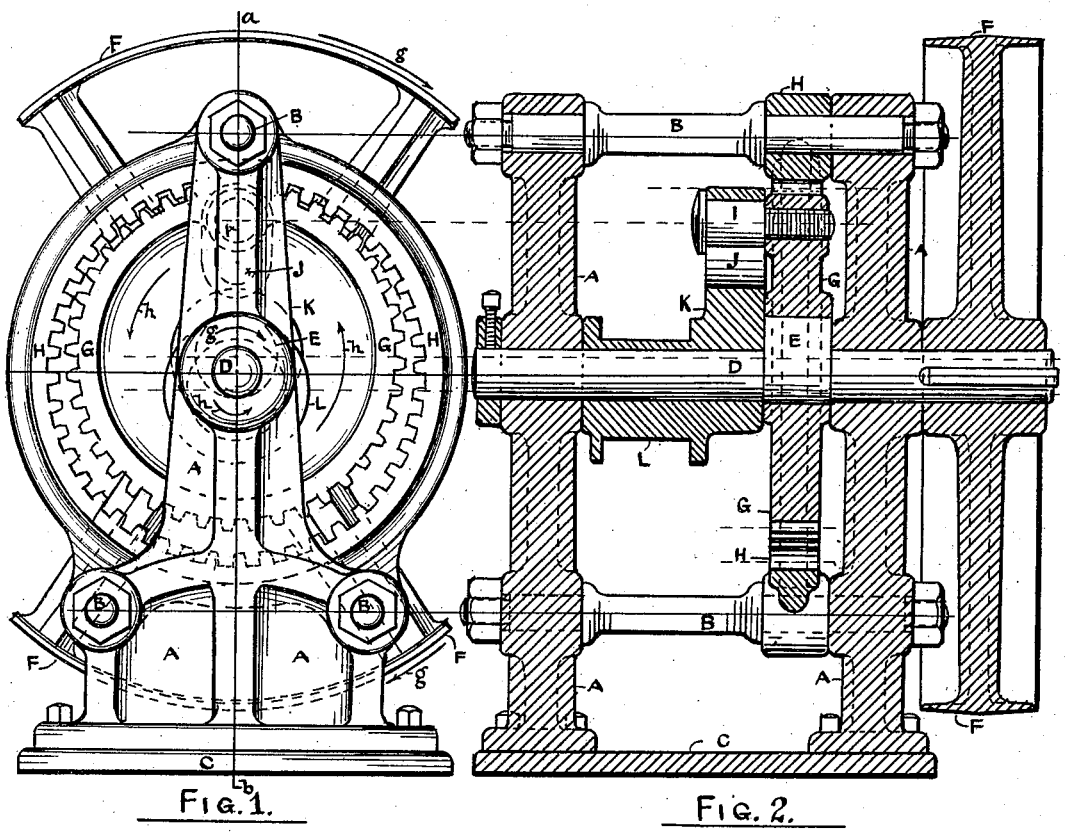
Figures 3, 4, 5, 6:
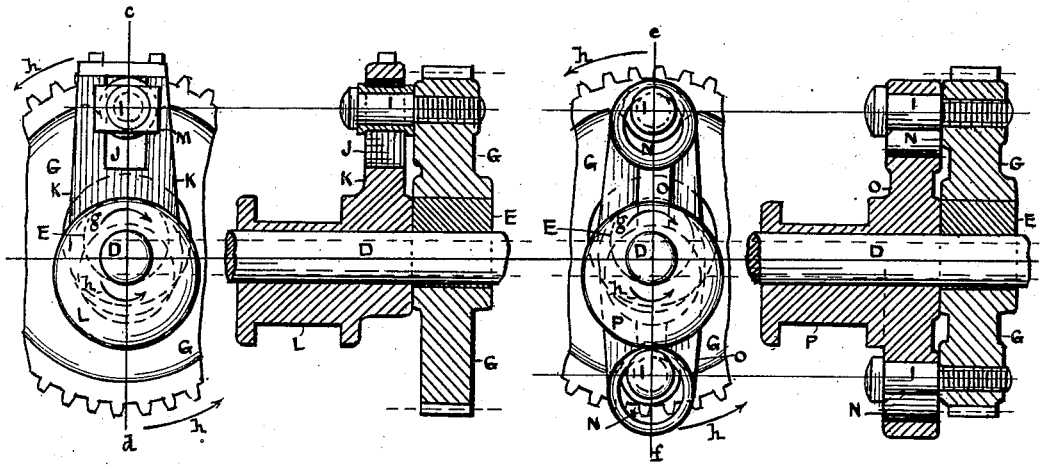

In the drawings forming part of this specification, Figure 1 is a side view of my said apparatus, and Fig. 2 is a vertical center section of the same on line $a\,b$. Figs. 3 and 4 are respectively side view and section on $c\,d$, showing the same as in Figs. 1 and 2 in part, but with a square box on the stud-pin working in the slotted arm in place of the stud-pin and slot of Figs. 1 and 2; and Figs. 5 and 6 show the same as Figs. 3 and 4 do, excepting the substitution for the single slotted arm and single stud-pin of two opposite arms with engaging arm-holes and stud-pins like those of my said patent.

In the drawings, two uprights, A A, connected by rods B B B, and fastened to a base-plate, C, form the frame of the said apparatus. A shaft, D, carrying a fixed eccentric, E, is journaled in the frame, and has fast to it a driving-pulley, F.

Journaled on eccentric E is a spur-gear, G, meshing and rolling in a ring annular gear, H, fastened to the frame concentric to shaft D by the rods B B B.

Fixed in the web of spur-gear disk G is a stud-pin, I, fitting and sliding in a radial slot, J, of an arm, K, of an eccentric, L, loose on shaft D, and forming the resistance-receiving part of the apparatus, which may be (instead of the eccentric L) substituted suitably by any common form of crank, pulley, drum, or gear, &c., for transmitting power.

When pulley F, shaft D, and eccentric E are revolved in the direction of arrows $g\,g$, the spur-gear G and arm K will turn on their axes in the direction of the arrows $h\,h$, and one revolution of shaft D gives, with the proportion of the apparatus shown, one-tenth of a revolution to gear G and arm K on their respective axes; hence, as the radius of pulley F is twenty times the radius of the eccentric L, the ratio of power and resistance forces in the described apparatus is ($10\times20=$) 200 to 1.

In the equal revolutions of gear G and arm K there will be unequal rotary motion of them, resulting from their axes not being concentric, and gear G will have regular rotary motion, while arm K and its eccentric L will have irregular rotary motion, varying in each revolution in proportion as the gear G is eccentric to the shaft D.

In Figs. 2 and 3 are shown shaft D and its eccentric E, gear G and its stud-pin I, arm K and its eccentric L, and arm-slot J, in which is fitted a slide-box, M, on the stud-pin I, in order to make a more durable bearing-surface than the pin I in the slot J has, as shown in Figs. 1 and 2.

In Figs. 4 and 5 are shown shaft D and its eccentric E, gear G, with two opposite stud-pins, I I, engaging in two opposite holes, N N, of a double arm, O O, concentric to shaft D, and having formed upon its hub an eccentric, P, like eccentric L. This combination gives equal and regular rotary motions of the gear G and arm O O and eccentric P, and is substantially the same in operation as that shown in my aforesaid patent of May 1, 1883. This combination, shown in the accompanying drawings, is for the purpose of comparison of it with the stud-pin and slotted-arm combination, and not to make claim to it in this application.

I claim as of my invention and desire to secure by Letters Patent—

The slotted arm K, engaged and operated by the stud-pin I, substantially as shown and described, in combination with mechanism, substantially as herein set forth, for transmitting differential rotary motion.

GEORGE F. CLEMONS.

Witnesses:
F. W. BARTLETT,
LAURA D. CLEMONS.